United States Patent
Fridman et al.

(10) Patent No.: US 11,423,785 B2
(45) Date of Patent: Aug. 23, 2022

(54) MULTI SATELLITE DETECTION AND TRACKING OF MOVING OBJECTS

(71) Applicant: IMAGESAT INTERNATIONAL (I.S.I) LTD, Or Yehuda (IL)

(72) Inventors: Natalie Fridman, Petach-Tikva (IL); Doron Amir, Tzur-Yigal (IL); Ilan Schvartzman, Beer-Sheva (IL); Noam Segal, Tel-Aviv (IL)

(73) Assignee: IMAGESAT INTERNATIONAL (I.S.I) LTD, Or Yehuda (IL)

( * ) Notice: Subject to any disclaimer, the term of this patent is extended or adjusted under 35 U.S.C. 154(b) by 575 days.

(21) Appl. No.: 16/335,265

(22) PCT Filed: Nov. 8, 2017

(86) PCT No.: PCT/IL2017/051216
§ 371 (c)(1),
(2) Date: Mar. 21, 2019

(87) PCT Pub. No.: WO2018/087755
PCT Pub. Date: May 17, 2018

(65) Prior Publication Data
US 2020/0018844 A1    Jan. 16, 2020

(30) Foreign Application Priority Data

Nov. 10, 2016 (IL) .......................... 248913

(51) Int. Cl.
*G01S 13/72* (2006.01)
*G08G 3/02* (2006.01)
(Continued)

(52) U.S. Cl.
CPC .............. *G08G 3/00* (2013.01); *G01S 13/726* (2013.01); *G08G 3/02* (2013.01); *B63B 79/00* (2020.01); *G01S 13/91* (2013.01)

(58) Field of Classification Search
CPC .......... G08G 3/00; G08G 3/02; G01S 13/726; G01S 13/91; B63B 79/00
See application file for complete search history.

(56) References Cited

U.S. PATENT DOCUMENTS

| | | | |
|---|---|---|---|
| 2016/0223683 A1* | 8/2016 | Boyarski | G01S 19/47 |
| 2018/0123680 A1* | 5/2018 | Stolte | H04B 7/18513 |

(Continued)

FOREIGN PATENT DOCUMENTS

| | | |
|---|---|---|
| CN | 106021675 | 10/2016 |
| EP | 2610636 | 7/2013 |

(Continued)

OTHER PUBLICATIONS

Office Action dated Aug. 16, 2020 From the Israel Patent Office Re. Application No. 248913 and Its Translation Into English. (7 Pages).

(Continued)

*Primary Examiner* — Donald HB Braswell
(74) *Attorney, Agent, or Firm* — Browdy and Neimark, PLLC

(57) ABSTRACT

A computer implemented method of tracking a travelling vessel, comprising obtaining a list of plurality of satellites capable of detecting the vessel at location(s) along predicted path(s) of the vessel. For each of the location(s) the following is performed:
(a) Predicting vessel's possible future location(s) according to estimated movement vectors derived from a movement graph generated based on historical movement path(s), a recent movement path and a current location of the vessel.
(b) Estimating satellites observation windows to identify candidate observation window(s) in which the satellite(s) have visual coverage of the possible future location(s).
(c) Calculating detection score for each candidate observation window according to location probability score (Continued)

assigned to the possible future locations and view probability score assigned to the candidate observation windows.
(d) Selecting preferred observation window presenting highest detection score.
(e) Repeating (a)-(d) in case the vessel not detected in the selected observation window.

19 Claims, 7 Drawing Sheets

(51) Int. Cl.
    *B63B 79/00*    (2020.01)
    *G01S 13/91*    (2006.01)
    *G08G 3/00*    (2006.01)

(56) References Cited

U.S. PATENT DOCUMENTS

2018/0201348 A1 * 7/2018 Delay ............... G05D 1/0206
2021/0241614 A1 * 8/2021 Mubarek .......... G08G 1/096838

FOREIGN PATENT DOCUMENTS

| EP | 2610636 A1 * | 7/2013 | ............... G08G 3/00 |
|---|---|---|---|
| JP | 2008126876 * | 6/2008 | ............... B64G 1/10 |
| KR | 10-2008-0006294 | 1/2008 | |
| WO | WO 2018/087755 | 5/2018 | |
| WO | WO 2018/087755 A9 | 5/2018 | |

OTHER PUBLICATIONS

International Preliminary Report on Patentability dated May 23, 2019 From the International Bureau of WIPO Re. Application No. PCT/IL2017/051216. (7 Pages).
International Search Report and the Written Opinion dated Feb. 22, 2018 From the International Searching Authority Re. Application No. PCT/IL2017/051216. (12 Pages).
Busler et al. "Tracking Vessels to Illegal Pollutant Discharges Using Multisource Vessel Information", The International Archives of the Photogrammetry, Remote Sensing and Spatial Information Sciences, 36th International Symposium on Remote Sensing of Environment, Berlin, Germany, May 11-15, 2015, XL-7/W3: 927-932, May 11, 2015. p. 928, Section 2.1.
Gao et al. "Multi-Satellite Observation Scheduling Based on a Hybrid Ant Colony Optimization", Proceedings of the 2nd International Symposium on Computer, Communication, Control and Automation, ISCCCA-13, Advanced Materials Research, 765: 532-536, Feb. 22, 2013.
Lane et al. "Maritime Anomaly Detection and Threat Assessment", 13th International Conference on Information Fusion, Edinburgh, UK, Jul. 26-29, 2010, p. 1-8, Jul. 26, 2010.
Li et al. "Planning Method for Multi-Satellite Cooperating Search for a Moving Target on the Sea", 2011 International Workshop on Multi-Platform/Multi-Sensor Remote Sensing and Mapping, M2RSM, Xiamen, China, Jan. 10-12, 2011, p. 1-6, Jan. 10, 2011.
Meng et al. "Object Tracking Using High Resolution Satellite Imagery", IEEE Journal of Selected Topics in Applied Earth Observations and Remote Sensing, 5(1): 146-152, Feb. 2012.
Nag et al. "CubeSat Constellation Design for Air Traffic Monitoring", Acta Astronautica, 128: 180-193, Available Online Jul. 11, 2016. p. 9, Left col. Lines 1-5.
Pallotta et al. "Vessel Pattern Knowledge Discovery From AIS Data: A Framework for Anomaly Detection and Route Prediction", Entropy, 15(6): 2218-2245, Jun. 4, 2013. Section 'Vessel Object Manager'.
Rhodes et al. "Probabilistic Associative Learning of Vessel Motion Patterns at Multiple Spatial Scales for Maritime Situation Awareness", 2007 10th International Conference on Information Fusion, Quebec, Que., Canada, Jul. 9-12, 2007, 8 P., Jul. 9, 2007.
Ristic et al. "Statistical Analysis of Motion Patterns in AIS Data: Anomaly Detection and Motion Prediction", 2008 11th International Conference on Information Fusion, Cologne, Germany, 30 Jun.-Jul. 3, 2008, p. 40-46, Jun. 30, 2008.
Riveiro et al. "Reasoning About Anomalies: A Study of the Analytical Process of Detecting and Identifying Anomalous Behavior in Maritime Traffic Data", Proceedings of SPIE: Visual Analytics for Homeland Defense and Security, Orlando, Florida, USA, Apr. 14, 2009, p. 73460A-1-73460A-12, Apr. 14, 2009.
Roy "Automated Reasoning for Maritime Anomaly Detection", Proceedings of the NATO Workshop on Data Fusion and Anomaly Detection for Maritime Situational Awareness, MSA 2009, NATO Undersea Research Centre (NURC), La Spezia, Italy, Sep. 2009, p. 15-17, Sep. 2009.
Snidaro et al. "Fusing Uncertain Knowledge and Evidence for Maritime Situational Awareness via Markov Logic Networks", Information Fusion, 21: 159-172, Jan. 2013.
Song et al. "An Exact Algorithm Optimizing Coverage-Resolution for Automated Satellite Frame Selection", Proceedings of the 2004 IEEE International Conference on Robotics and Automation, ICRA '04, New Orleans, LA, USA, Apr. 26-May 1, 2004, 1: 63-70, Apr. 16, 2004.
Thomas "Maritime Domain Awareness", Coast Guard Journal of Safety & Security at Sea, Proceedings of the Marine Safety & Security Council 2006, 63(1): 36-38, Spring 2006.
Tun et al. "Maritime Port Intelligence Using AIS Data", Recent Advances in Security Technology, Proceedings of the 2007 RNSA Security Technology Conference, Melbourne, Australia, Chap.3: 33-43, 2007.
Supplementary European Search Report and the European Search Opinion dated Jun. 17, 2020 From the European Patent Office Re. Application No. 17868838.8. (12 Pages).
Prevost et al. "Ship Localization Using AIS Signals Received by Satellites", Proceedings of the 21st European Signal Processing Conference, EUSIPCO 2013, Marrakech, Morocco, Sep. 9-13, 2013, XP032593863, p. 1-5, Sep. 9, 2013.
Thomas "Civilian Earth Observation Satellites for Global Maritime Awareness. Effective? Affordable?", The Coast Guard Journal of Safety & Security at Sea, Proceedings of the Marine Safety & Security Council, XP055030326, p. 38-40, Aug. 10, 2010.
Walker et al. "A Pioneer Validation of a State-Space Model of Vessel Trajectories (VMS) With Observers' Data", Ecological Modelling, XP027206999, 221(17): 2008-2017, Available Online Jun. 18, 2010.

* cited by examiner

MULTI SATELLITE DETECTION AND TRACKING OF MOVING OBJECTS

RELATED APPLICATIONS

This application is a National Phase of PCT Patent Application No. PCT/IL2017/051216 having International filing date of Nov. 8, 2017, which claims the benefit of priority of Israel Patent Application No. 248913 filed on Nov. 10, 2016. The contents of the above applications are all incorporated by reference as if fully set forth herein in their entirety.

FIELD AND BACKGROUND OF THE INVENTION

The present invention, in some embodiments thereof, relates to tracking a travelling vessel and, more particularly, but not exclusively, to tracking a travelling vessel by predicting a possible paths of the vessel and estimating a probability of detection of the vessel based on its historical navigation data to enable the imagery acquisition of the vessel by plurality of satellites.

There is a growing need for coverage detection of large maritime areas, mainly in the exclusive economic zone (EEZ), in particular for tracking travelling vessels. This need may be motivated by commercial incentives, security demands, regulation requirements and/or the like.

SUMMARY OF THE INVENTION

According to a first embodiment of the present invention there is provided a computer implemented method of tracking a travelling vessel, comprising:
  Obtaining a list of plurality of satellites capable of detecting a travelling vessel using predicted paths of the vessel and identifying one or more of the plurality of satellites capable of detecting the vessel in one or more of a plurality of locations along the predicted paths, for the one or more locations the following is performed.
  Predicting a plurality of possible future locations of the vessel according to a plurality of estimated movement vectors derived from a movement graph of the vessel generated based on one or more historical movement paths, a recent movement path and a current location of the vessel.
  Estimating a plurality of observation windows of the plurality of satellites to identify a plurality of candidate observation windows in which one or more of the plurality of satellites has a visual coverage of the each possible future location.
  Calculating a detection probability score for each of the plurality of candidate observation windows according to a location probability score assigned to each of the plurality of possible future locations and a view probability score assigned to each of the plurality of candidate observation windows.
  Selecting a preferred one of the candidate observation windows presenting a highest the detection probability score.
  Repeating the predicting, the estimating, the calculating and the selecting in case the vessel is not detected during the preferred candidate observation window.
Accurately predicting the vessel's future location(s) in order to identify the candidate observation window(s) of the satellites that are likely to allow detection of the vessel may allow improved tracking of the vessel using satellites that are capable of high visibility coverage while reducing costs for reserving satellite imagery resources.

According to a second embodiment of the present invention there is provided a system for tracking a travelling vessel, comprising one or more processors adapted to execute a code, the code comprising:
  Code instructions to obtain a list of plurality of satellites capable of detecting a travelling vessel using predicted paths of the vessel and identifying one or more of the plurality of satellites capable of detecting the vessel in one or more of a plurality of locations along the predicted paths, for the one or more location the code comprises:
    Code instructions to predict a plurality of possible future locations of the vessel according to a plurality of estimated movement vectors derived from a movement graph of the vessel, generated based on one or more historical movement path, a recent movement path and a current location of the vessel.
    Code instructions to estimate a plurality of observation windows of the plurality of satellites to identify a plurality of candidate observation windows in which one or more of the plurality of satellites has a visual coverage of each of the each possible future location.
    Code instructions to calculate a detection probability score for each of the plurality of candidate observation windows according to a location probability score assigned to each of the plurality of possible future locations and a view probability score assigned to each of the plurality of candidate observation windows.
    Code instructions to select a preferred one of the plurality of candidate observation windows presenting a highest the detection probability score.
    Code instructions to repeat the predict, the estimate, the calculate and the select in case the vessel is not detected during the preferred candidate observation window.
Accurately predicting the vessel's future location(s) in order to identify the candidate observation window(s) of the satellites that are likely to allow detection of the vessel may allow improved tracking of the vessel using satellites that are capable of high visibility coverage while reducing costs for reserving satellite imagery resources.

According to some aspects of the first and/or second embodiments of the invention, at least some of the plurality of satellites are low earth orbiting satellites having a radial velocity higher than a self-rotation velocity of earth thus each of the at least some satellites completes a respective orbit faster than a complete self-rotation of earth. The low orbiting satellites may provide efficient coverage of the Earth surface in order to track the vessel.

According to some aspects of the first and/or second embodiments of the invention, the recent movement path is determined according to a movement information of the vessel extracted from a plurality of periodic Automatic Identification system (AIS) transmissions received from the vessel. The AIS transmissions received by AIS collection system(s) may identify the geographical location of the vessel at the time of the AIS transmission.

According to some aspects of the first and/or second embodiments of the invention, each of the plurality of periodic AIS transmission includes at least some dynamic parameters of the vessel, the at least some dynamic parameters are members of a group consisting of: a current location, a speed over ground (SOG) and a course over ground (COG). The dynamic parameters information may be used to track accurately the vessel in order to create an accurate movement graph for the vessel.

Optionally, according to some aspects of the first and/or second embodiments of the invention, the movement information is adjusted based on past movement information of the vessel during past trips presenting at least some similarity to the recent movement path. The past movement information may allow identification of movement patterns that allow better estimation of the current movement path.

According to some aspects of the first and/or second embodiments of the invention, the current location is derived from the movement graph by fitting an interpolated the recent movement path to the movement graph. Interpolating the recent movement path may allow better fitting of the current path to the movement graph in order to increase accuracy of the current location.

According to some aspects of the first and/or second embodiments of the invention, the movement graph comprises a plurality of nodes connected by a plurality of weighted edges. Each of the plurality of nodes represents a geographical location of the vessel and each of the plurality of weighted edges represents a transition between a pair of the plurality of nodes. A weight of each of the plurality of weighted edges indicates a probability of the transition represented by the each weighted edge. The movement graph may be applied with analytical tools to estimate the vessel's movement path and predict the vessel's possible future location.

According to some aspects of the first and/or second embodiments of the invention, the movement graph is generated using a second order Markov chain model. Each of the plurality of nodes is calculated based on a preceding node and a succeeding node of the plurality of nodes according to the probability of one or more of the plurality of weighted edges connecting the node to each of the two other nodes. The two other nodes comprise a source node and a destination node. The second order Markov chain model may enable accurate path estimation based on the current previous and following nodes of the graph, where each node represent spatially close geographical location(s) clustered together.

Optionally, according to some aspects of the first and/or second embodiments of the invention, one or more of the plurality of weighted edges are divided to a plurality of velocity segments. During each one of the plurality of velocity segments the vessel travels at a velocity that is different from the velocity of a preceding segment of the plurality of velocity segments and a succeeding segment of the plurality of velocity segments. The weighted edges are divided in order to more accurately estimate the vessel's velocity thus more accurately the respective possible future location(s).

According to some aspects of the first and/or second embodiments of the invention, each of the plurality of estimated movement vectors comprises an estimated direction of the vessel and an estimated velocity of the vessel for calculating each of the plurality of possible future locations at each of a plurality of times to match each of the candidate observation windows.

According to some aspects of the first and/or second embodiments of the invention. one or more of the plurality of estimated movement vectors is calculated based on a Min-Max Walk model applied to a plurality of velocity segments of one or more edges representing the one or more estimated movement vectors in the movement graph.

The Min-Max Walk model extracts a polygon representing the one or more estimated movement vectors by:

Estimating the one or more movement vectors while the vessel travels at a minimum velocity extracted from the plurality of velocity segments.

Estimating the one or more movement vectors while the vessel travels at a maximum velocity extracted from the plurality of velocity segments.

Applying each of the estimations with a respective probability assigned to the one or more edges.

The Min-Max Walk model may allow improved precision in estimating the vessel's velocity in order to more accurately estimate the possible future location(s).

According to some aspects of the first and/or second embodiments of the invention, one or more of the plurality of estimated movement vectors is estimated by simulating a plurality of simulation agents according to a Uniform Walk model. Each of the plurality of agents is assigned with a different one of a plurality of velocities extracted from a plurality of velocity segments of one or more edges representing one or more estimated movement vectors in the movement graph. The different velocity is calculated using a uniform distribution.

The Uniform Walk model may allow improved precision in estimating the vessel's velocity in order to more accurately estimate the possible future location(s).

According to some aspects of the first and/or second embodiments of the invention, one or more of the plurality of estimated movement vectors is estimated by simulating a plurality of simulation agents according to a Normal Walk model. Each of the plurality of agents is assigned with a different on of a plurality of velocities extracted from a plurality of velocity segments of one or more edge of representing the one or more estimated movement vector in the movement graph. The different velocity is calculated using a Gaussian distribution.

The Normal Walk model may allow improved precision in estimating the vessel's velocity in order to more accurately estimate the possible future location(s).

According to some aspects of the first and/or second embodiments of the invention, each of the plurality of observation windows is estimated by applying a multi-satellite simulation to identify a location of each of the plurality of satellites in order to determine whether each satellite has a visual coverage of a respective one of the plurality of possible future locations at a time in which the vessel is located at the respective possible future location. The satellite location is a complex computation requiring the multi-satellite simulation for calculate an exact location of each of the satellites each having a different orbiting parameters.

According to some aspects of the first and/or second embodiments of the invention, the multi-satellite simulation is based on one or more of a plurality of orbiting parameters of each of the plurality of satellites. The one or more orbiting parameters is a member of a group consisting of: an orbit, an orbit schedule, an elevation angle indicating an angle between the each satellite and surface and/or a sun-ground elevation angle indicating an angle between sun and surface. The orbiting parameters may be used by the multi-satellite simulation to calculate the location of each of the satellites.

According to some aspects of the first and/or second embodiments of the invention, the location probability score indicates a probability of the vessel being located at a respective one of the plurality of possible future locations at a time of a respective one of the candidate observation windows.

According to some aspects of the first and/or second embodiments of the invention, the view probability score indicates a probability of the one or more satellite having the visual coverage during the respective one of the candidate observation windows.

According to some aspects of the first and/or second embodiments of the invention, the location probability score of each of the plurality observation windows is calculated by applying a normalized sum over a subset of the plurality of possible future location observable by the one or more satellites during the respective observation window. Normalizing the subset of possible future locations relating to a respective one of the possible future locations may reduce the prediction error for the respective possible future location.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
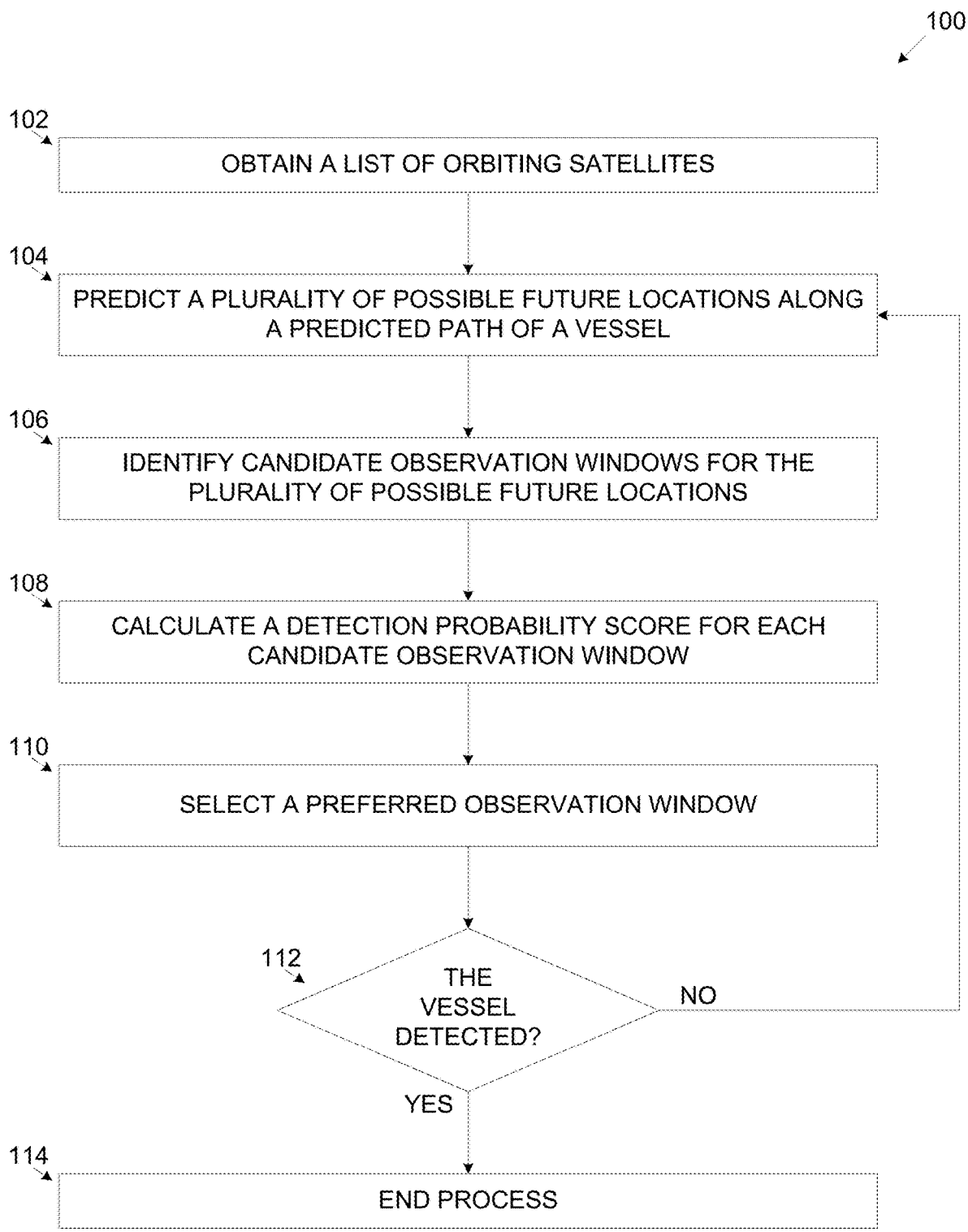
FIG. 1 is a flowchart of an exemplary process for selecting an observation window of a satellite for detecting a vessel at a future time, according to some embodiments of the present invention.

The present invention, in some embodiments thereof, relates to tracking a travelling vessel and, more particularly, but not exclusively, to tracking a travelling vessel by predicting a path of the vessel and estimating a probability of detection of the vessel by a plurality of satellites.

According to some embodiments of the present invention, there are provided methods, systems and computer program products for identify potential satellite(s) observation windows along a predicted future path of one or more travelling vessels in order to visually track the vessel(s) using the satellite(s). The vessel(s) path may be predicted in order to identify candidate observation windows of a plurality of satellites in which the vessel may be detected at a plurality of future geographical locations along the predicted paths. Preferred satellite(s) and associated observation window(s) may be selected based on probability scores calculated for each of the candidate observation windows and selecting the candidate observation window(s) presenting the highest probability to detect the vessel.

The predicted paths are estimated based on a current geographical location of the vessel and a recent movement path the vessel travelled to reach the current geographical location. The current geographical location and the recent movement path of the vessel may be available from, for example, a plurality of Automatic Identification System (AIS) signals transmitted by the vessel, a visual detection indication received from satellite(s) detecting the vessel at previous geographical location(s) along the current movement path and/or the like. The path prediction may be further based on an estimated recent movement path of the vessel and/or on past AIS information recorded from the vessel during one or more past trips presenting at least some similarity to the current path. The predicted path may be estimated and/or simulated using a movement graph created based on movement patterns detected and/or learned using one or more of a plurality of behavioral models, for example, Hidden Markov Model and/or the like.

A plurality of movement vectors may be derived from the vessel's current geographical location and the recent movement path, where each of the movement vectors indicates one of a plurality of possible future (geographical) locations in which the vessel is expected to arrive at a certain point in time, i.e. the vessel is located at the respective possible future location.

Each of the plurality of satellites, for example, low orbit satellites and/or geo-stationary satellites, has a plurality of observation windows defining a time and a visual coverage of a geographical area of earth derived according to the satellite's orbiting characteristics, for example, speed, altitude, camera viewing angle and/or the like.

For each of the plurality of possible future location, one or more candidate observation windows are identified for the plurality of satellites using one or more multi-satellite simulation tools, for example, Satellite Tool Kit (STK). As result one or more of the possible future location may be associated with respective one or more candidate observation windows, where during each of the candidate observation windows the satellite associated with the respective candidate observation window may have a visual coverage area that includes the associated possible future location and may thus allow detection of the vessel at the respective possible future location.

Using a multi-satellite scheduling algorithm, a detection probability score is calculated for each of the candidate observation windows according to a location probability score and a view probability score. The location probability score may be calculated for the respective possible future location associated with the candidate observation window. The view probability score may indicate the probability of the associated satellite to detect the vessel at the respective possible future location during the candidate observation window. One or more candidate observation windows presenting the highest detection score may be selected to allow reserving resources of the associate satellite during the selected observation window. In case the vessel is not detected during the selected observation window(s), the process 100 may be repeated to select one or more other observation windows to detect the vessel.

The process of estimating the vessel's path and selecting one or more observation windows to detect the vessel along its path may be repeated for the duration of the vessel's trip and/or a part thereof.

The multi-satellite scheduling vessel tracking may present significant benefits compared to existing methods for detecting travelling vessels along their course, in particular with respect to accuracy of the predicted vessel path as well as to long term vessel behavior prediction.

Most of the existing methods do not apply satellite imagery for detecting the travelling vessels along their course and may therefore be limited to the means applied by the existing methods, for example, AIS transmission, self-identification of the vessel and/or the like. Furthermore, most of the existing methods may be directed towards anomalous behavior detection of the vessel(s) and/or to event recognition in order to detect abnormal vessel behavior and may thus be unsuitable for vessel(s) tracking. Some of the existing methods may apply statistical tools for analyzing, for example, the vessels AIS transmissions and predict a future path of the vessel according to the derived statistical model. Some of the existing methods may also apply machine learning, for example, clustering tools, Artificial Neural Network and/or the like for predicting vessel behavior. The existing methods that are directed to vessel behavior detection may be limited to predict only short term vessel behavior, for example, in a range of minutes up to a little more than an hour. The existing methods may be further limited to large-scale vessel tracking, i.e. movement between large maritime regions, for example, water bodies, geographical regions and/or the like.

The multi-satellite scheduling bases the vessel tracking on satellite imagery resources. Using the satellite imagery resources may present several challenges. One challenge may relate to the coverage area of the satellites, i.e. which of the geographical locations along the vessel's path (or predicted path) may be observed by one or more of the satellites to detect the vessel. Another challenge may relate to the leasing costs of the satellite imagery resources that may typically be high. In order to make efficient and cost effective use of the satellite imagery resources, the multi-satellite scheduling vessel tracking identifies the most promising satellites opportunity window(s) that presents the highest probability to detect the travelling vessel at one or more future locations of the vessel along its course. By accurately predicting the possible future location(s) of the vessels coupled with an estimation of the visual coverage area provided by the candidate observation windows, the multi-satellite scheduling vessel tracking may efficiently reserve satellite imagery resources suitable to detect the vessel when arriving at each of the reserved observation window(s). This may significantly reduce costs of the satellite imagery resources since only the most effective (probable) observation window(s) may be reserved thus avoiding reservation of excessive and/or redundant satellite imagery resources.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process for selecting an observation window of a satellite for detecting a vessel at a future time, according to some embodiments of the present invention. A process 100 may be executed to identify potential satellite(s) observation window(s) along a predicted future path of one or more travelling vessels in order to track visually the vessel(s) from the satellite(s). One or more learning models, for example, Hidden Markov Model and/or the like may be applied on historical (past) data comprising information of one or more historical (past) paths of the vessel to derive estimated movement patterns of the vessel(s) in order to create a movement graph for each vessel. Based on the movement graph, given the current location of the vessel(s) and the recent path (course) of the vessel, future path(s) of the respective vessel may be simulated. The current location and the recent path of the vessel may be established and/or estimated according to AIS transmissions received from the vessel(s). A plurality of possible future locations of the vessel(s) may be estimated using the movement graph. Using one or more multi-satellite simulation tools, for example, STK, one or more observation windows of one or more satellites may be identified for each of the possible future locations. Each of the observation windows indicates a visual coverage of a geographical area and a time frame of its associated satellite thus presenting a probability of detecting the vessel(s) at the respective possible future location. A detection probability may be calculated for each of the observation windows based on a location probability (indicating the probability of the vessel to be at the respective possible future location) and a view probability (indicating the probability of the associated satellite opportunity window to detect the vessel at the respective possible future location). One or more observation windows presenting the highest detection probability score may be selected to allow reservation in advance of the associated satellite(s) imagery resources during the selected observation window(s). In case the vessel is not detected during the selected observation window(s), the process 100 may be repeated to select one or more other observation windows to detect the vessel. While the process 100 may be applied to support tracking a plurality of vessels, for brevity, the process 100 is described for a single vessel.

Figure 2:
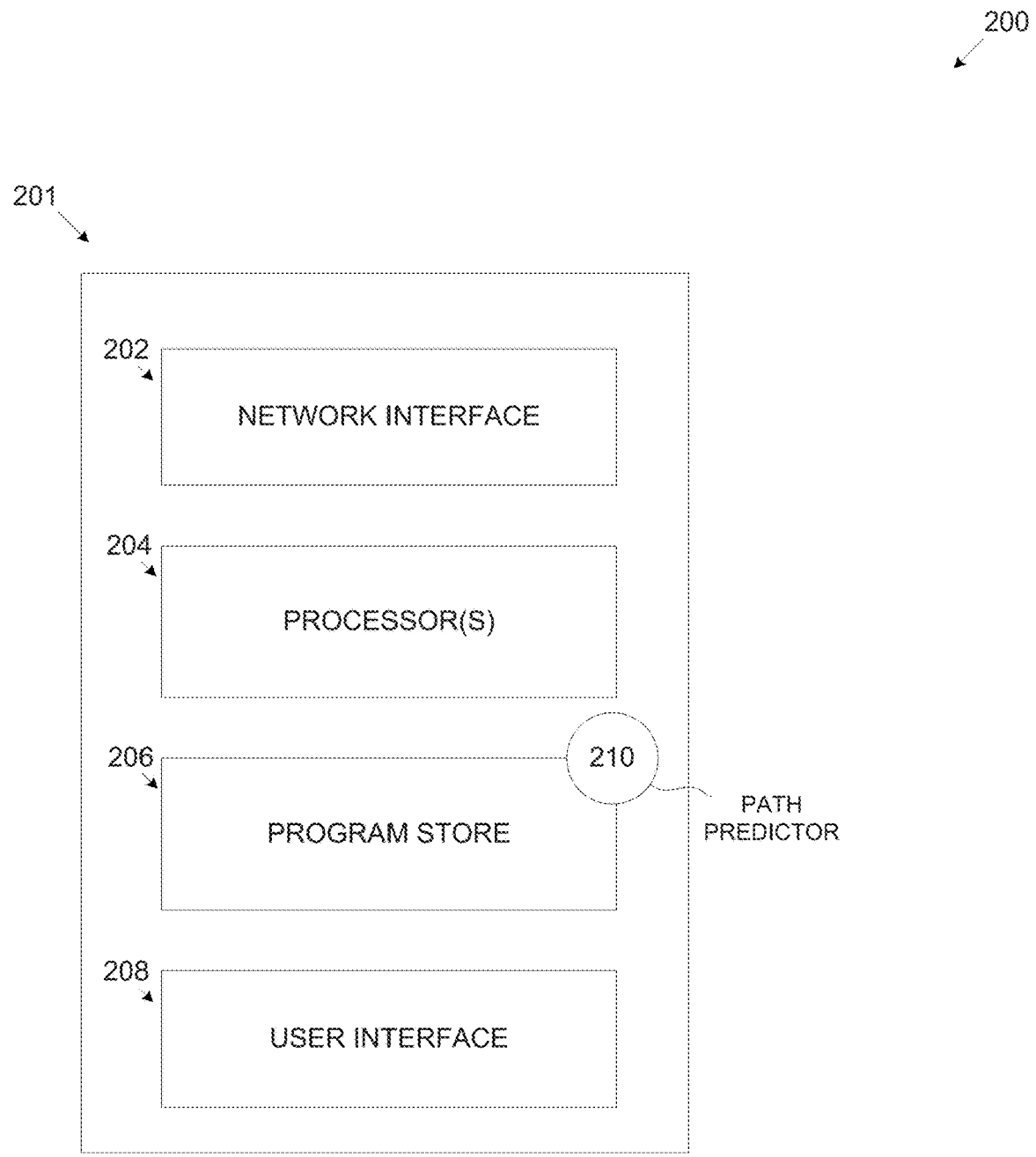
FIG. 2 is a schematic illustration of an exemplary system for selecting an observation window of a satellite for detecting a vessel at a future time, according to some embodiments of the present invention.

Reference is also made to FIG. 2, which is a schematic illustration of an exemplary system for selecting an observation window of a satellite for detecting a vessel at a future time, according to some embodiments of the present invention. A system 200 for implementing a process for identifying and selecting observation window(s) of satellites in order to track vessel(s) such as the process 100 includes a network interface 202 for connecting to one or more networks, a processor(s) 204 for executing a process such as the process 100 and a program store 206 for storing code. The network interface 202 may provide connectivity the network(s), for example, a Local area Network (LAN), a Wide Area Network (WAN), a cellular network, a wireless network and/or the like. Through the network interface 202, the system 200 may communicate with one or more remote and/or on site systems and/or processing nodes, for example, an AIS system, a satellite resources reservation system, a satellite simulation system and/or the like. The processor(s) 204, homogenous or heterogeneous, may include one or more processing nodes arranged for parallel processing, as clusters and/or as one or more multi core processor(s). The program store 206 may include one or more non-transitory, non-volatile devices, for example, a hard drive, a solid-state drive, a Flash array, an attachable memory device and/or the like. The program store 206 may further comprise one or more network storage devices, for example, a storage server, a network accessible storage (NAS) a network drive, and/or the like that are accessible through the network interface 202. The program store 206 may be used for storing one or more software modules such, for example, a path predictor 210 for predicting a path of one or more vessels and selecting one or more observation windows of associated satellite(s) for detecting the travelling vessel(s). The path predictor 210 may include one or more software modules wherein a software module refers to a plurality of program instructions stored in a non-transitory medium such as the program store 206 and executed by a processor such as the processor(s) 204. The program store 206 may also include one or more volatile devices, for example, a Random Access Memory (RAM) and/or the like for supporting the processor(s) 204 and/or for storing one or more of the software modules downloaded from a remote location through the network interface 202. Optionally, the system 200 is implemented as one or more cloud services for example, a software as a service (SaaS), a platform as a service (PaaS) and/or the like. The cloud service(s) may be accessible by one or more users using one or more client terminals, for example, a personal computer (PC), a laptop, a work station, a tablet, a console and/or the like executing one or more access applications, for example, a dedicated application, a web browser and/or the like.

Optionally, the system 200 includes a user interface 208 for interacting with one or more users. The user interface 208 may include a one or more human-machine interfaces, for example, a text interface, a pointing devices interface, a display, an audio interface and/or the like. The user interface 208 may include, for example, a graphic user interface (GUI) utilized through the human-machine interface(s).

As shown at 102, the path predictor 210 obtains a list of a set comprising a plurality of satellites orbiting earth and comprising imagery resources, for example, a camera, a night vision capturing device, a thermal capturing device and/or the like for capturing optic and/or thermal imagery of earth. One or more of the satellites may be low orbit satellites orbiting at low altitude above earth and hence travelling at a radial velocity higher than the self-rotation velocity of earth. The low orbiting satellites may therefore circle earth several times a day. One or more of the satellites may also be geo-stationary satellites located at high altitude above earth and moving at substantially the same self-rotation velocity of earth such that they may be substantially stationary above a region of earth. Each of the satellites may provide one or more observation windows defined by time and space, where during a time of each of the observation windows the imagery resources of the associated satellite are capable of capturing a defined coverage area. The coverage area for each of the observation may be derived from one or more orbiting parameters of the associated satellite, for example, an orbit, an elevation angle indicating an angle between the satellite and earth surface, a sun-ground elevation angle indicating an angle between the sun and earth surface and/or the like. The set of satellites may be defined as Sat={$sat_0$, ..., $sat_{m-1}$} comprising m satellites, where each satellite has an orbit provided by a set O={$o_0$, ..., $o_{m-1}$}. The set of satellites may include, for example, 9 satellites, such a, for example, CosmoSkymed-1, CosmoSkymed-2, CosmoSkymed-3, CosmoSkymed-4, DEIMOS-2, Eros-B, Kompsat-5, Radarsat-2 and TerraSarX.

As shown at 104, the path predictor 210 predicts a predicted future path of the vessel. The path predictor 210 predicts the paths of the vessel by estimating a plurality of future (geographical) locations along the predicted path according to a current (geographical) location of the vessel and a recent path the vessel travelled to arrive at the current location. The process described herein after may be repeated for a plurality of the future locations until the vessel has been detected.

Based on the current location of the vessel and the recent path, the path predictor 210 may generate one or more estimated movement vectors, each leading to a possible future location of the vessel. The path predictor 210 may create one or more behavioral models of the vessel in order to calculate the estimated movement vectors. The behavioral model(s), for example, a Second Order Markov Chain may be used to learn one or more movement patterns of the vessel using historical movement information of the vessel's path during one or more historical (past) trips in order to create a movement graph G(x) describing the path of the vessel (x). The movement graph G(x) may then be used to estimate the future predicted paths of the vessel. In particular, at each geographical location, the path predictor 210 may predict the next future locations of the vessel according to the current location and the movement graph G(x). The behavioral model may be created based on the collected vessel's historical AIS information.

The AIS information comprises AIS transmissions received from the vessel during the current and the past historical trips. Each AIS message may contain unique identification of the vessel and one or more static and/or dynamic properties of the vessel. The static properties may include, for example, a vessel name, a vessel type, a vessel dimensions, a destination and/or the like. The dynamic properties may include, for example, a geographical location, a Speed over Ground (SOG), a Course over Ground (COG) and/or the like. The dynamic properties are typically considered as reliable since they may be automatically monitored and/or collected through instrumentation on the vessel. The static properties however, may often proof to be unreliable (not updated or contain missing values) as they may typically need to be manually inserted and/or provided by one or more persons, for example, a pilot, a captain, a crew member and/or the like. The AIS transmissions may be collected by one or more AIS collection systems, for example, a satellite based system, a shore-based station, an internet connected station and/or the like available from one or more service providers. The path predictor 210 may obtain the AIS information from the AIS collection system(s) over one or more networks through the network interface 202.

Figure 3:
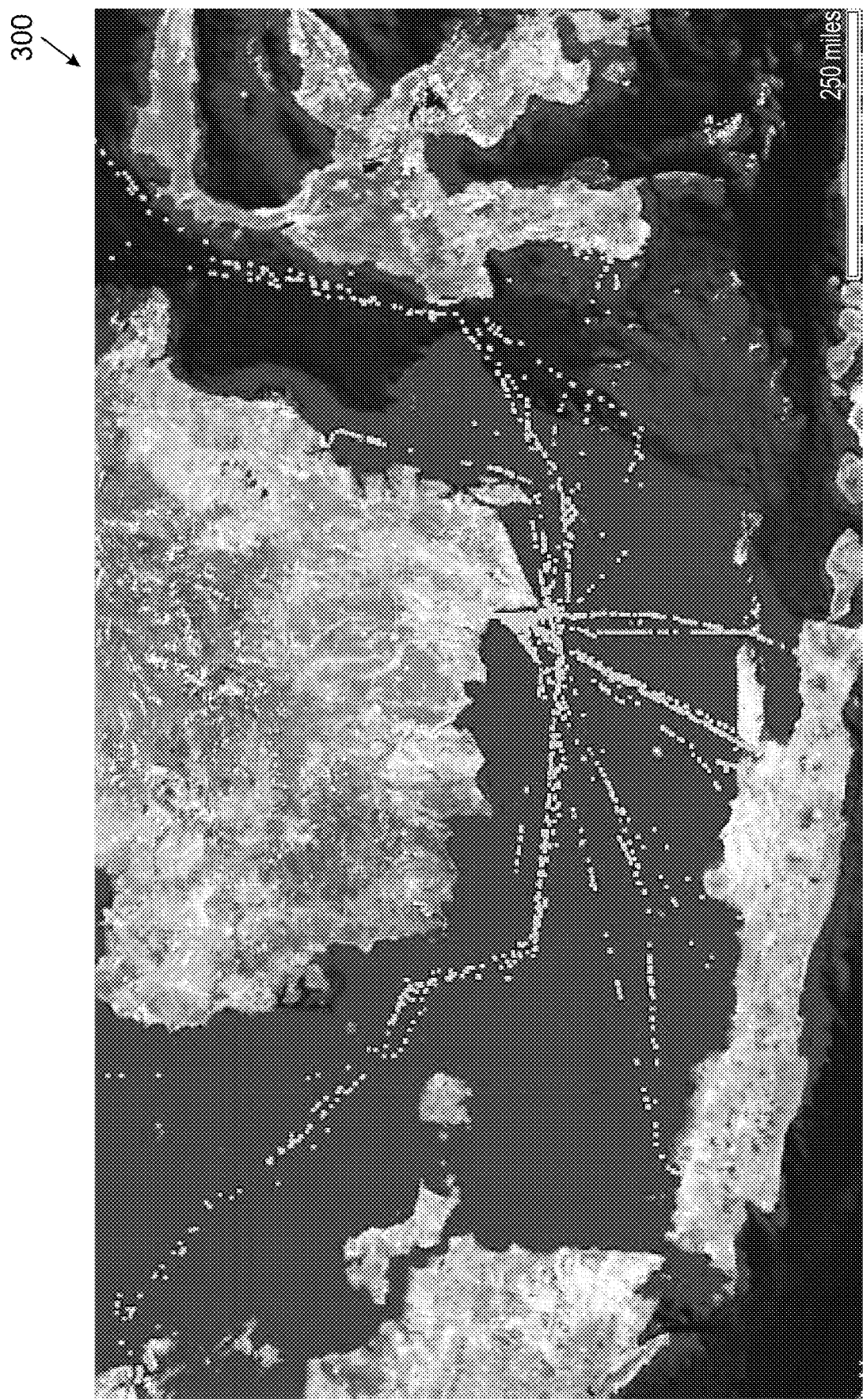
FIG. 3 is an exemplary processed imagery capture presenting vessels' routes recorded based on AIS transmissions of the vessels.

Reference is now made to FIG. 3, which is an exemplary processed imagery capture presenting vessels' routes recorded based on AIS transmissions of the vessels. A processed imagery capture 300 presents geographical locations in which AIS transmissions are received from a plurality of vessels thus the actual courses (paths) of the vessels may be extracted and/or recorded.

Reference is made once again to FIG. 1 and FIG. 2.

The AIS information may often be noisy, corrupted and/or insufficiently frequent (received at a low sampling rate) due to one or more reasons. For example, inability of the AIS collection system(s) to receive and/or process the huge amount of AIS information transmitted by a plurality of vessels, low coverage maritime regions in which the AIS transmissions are not received by the AIS collection system(s) and/or the like. The may result in receiving AIS (message) transmissions at prolonged time intervals, for example, a few hours and more, that may lead to uncertainty in following the vessel's movement.

In order to overcome the uncertainty resulting from the missing AIS information, the path predictor 210 may apply some pre-processing to the available (and typically incomplete) AIS information in order to provide a more comprehensive and/or complete AIS information in order to create the movement graph G(x) using the behavioral model.

The path predictor 210 may first complete missing path data of the vessel from which AIS messages (signals) were not received. The path predictor 210 may complete the missing location based on similar past (historical) paths of the vessel during the past trips. Let D={$d_0$, ..., $d_{m-1}$} be a set of geographical locations along a path of the vessel. The geographical locations of D are identified based on AIS messages received from the vessel by the AIS collection system(s) at these geographical locations. For each pair of consecutive geographical locations $d_i$ and $d_{i+1}$ of D for which the time interval between the respective AIS transmissions is larger than a pre-defined value, for example, one hour, the path predictor 210 may add one or more missing geographical locations that are estimated to be part of the examined or current path. The path predictor 210 may estimate the missing geographical locations based on AIS information received at past (geographical) locations along a past path during one or more past trips of the vessel where the past path(s) present similarity to the current path. The AIS messages transmitted by the vessel at the past geographical locations were received by the AIS collection system(s). The similarity may be expressed in spatial proximity of the geographical locations along the current path compared to the past path(s). The geographical locations of the current path may be further correlated to the geographical locations of the past path(s) according to the time intervals between AIS transmission at one or more preceding geographical locations and/or succeeding geographical locations along the examined path compared to the past path(s).

For example, assuming $D_1=\{d_{0_j}, \ldots, d_{n-1_j}\}$, and $D_k=\{d_{0_k}, \ldots, d_{m-1_k}\}$ are two sets of geographical locations along two paths such as, for example, the examined path and one of the past paths. The paths $D_j$ and $D_k$ may be considered similar in case a spatial similarity and a time similarity are identified between the paths $D_j$ and $D_k$. The time similarity indicates that the time interval (difference) between AIS transmission transmitted at the geographical locations $d_{n-1_j}$ and $d_{0_j}$ is substantially similar to the time interval (difference) between AIS transmission transmitted at the geographical locations $d_{m-1_k}$ and $d_{0_k}$. The spatial similarity indicates that the geographical location (coordinates) of $d_{0_j}$ is substantially close to $d_{0_k}$ and is substantially close to $d_{m-1_k}$.

The path predictor 210 may apply a similarity criterion as expressed in Equation 1 below to identify a path from a set of L paths $\{D_1, \ldots, D_L\}$ that present highest similarity to the examined path $D=\{d_0, \ldots, d_{m-1}\}$.

$$MostSimilar = \operatorname{argmin}_{l \in L} \frac{dist(d_i, d_{0_l})}{\sigma_0} + \frac{dist(d_{i+1}, d_{m-1_l})}{\sigma_1} + \frac{(\Delta t_i - \Delta t_l)^2}{\sigma_t} \quad \text{Equation 1}$$

Where the distance function dist( ) may be utilized by a haversine function and a is the standard deviation from all the geographical locations that were found similar to the respective geographical location of the current path. Optionally, in order to improve matching with respect to both the spatial similarity and the time similarity, paths of the set L that comply with the similarity criterion of the equation 1, the path predictor 210 interpolates the complying paths using one or more interpolation methods, for example, Slerp and/or the like.

Figure 4A:
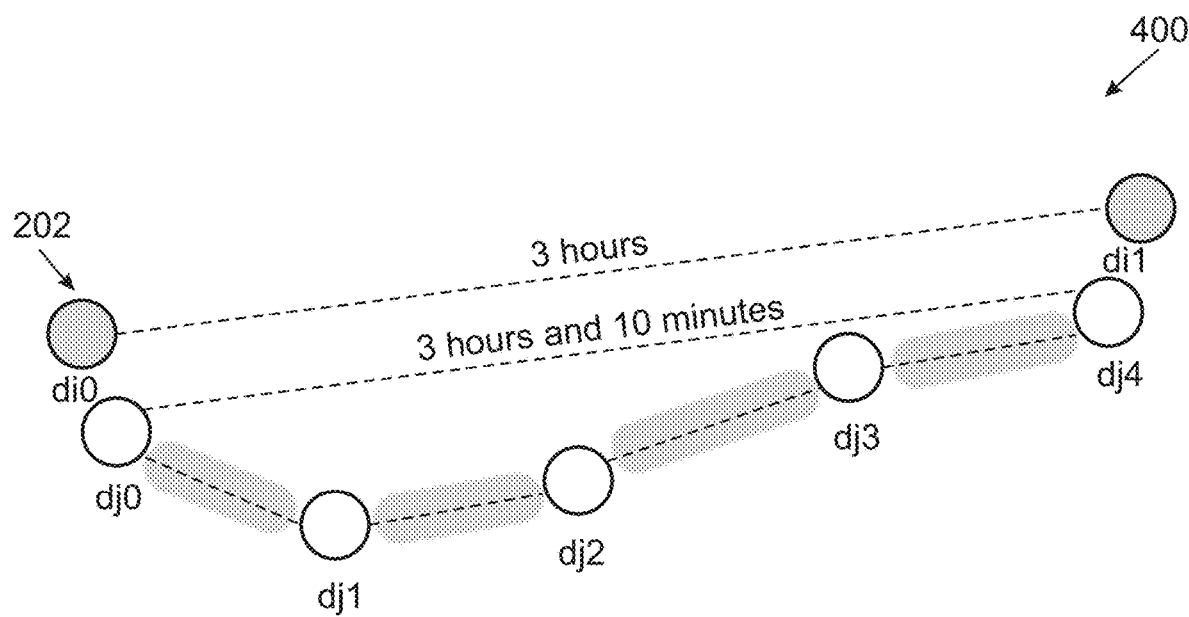
FIG. 4A is a schematic illustration of an exemplary estimated vessel's path estimated based on completion of missing AIS information, according to some embodiments of the present invention.

Reference is now made to FIG. 4A, which is a schematic illustration of an exemplary estimated vessel's path estimated based on completion of missing AIS information, according to some embodiments of the present invention. An illustration 400 presents geographical locations $d_{i0}$ and $d_{i1}$ of a first path $D_i$ and geographical locations $d_{j_0}, d_{j_1}, d_{j_2}, d_{j_3}, d_{j_4}$ of a second path $D_j$ with a time interval of approximately 3 hours between the AIS transmission received from the vessel at the geographical locations $d_{i0}$ and $d_{i1}$. Assuming the desired time interval between the AIS transmission received from the vessel at the geographical locations $d_{i0}$ and $d_{i1}$ is more than 1 hour, a path predictor such as the path predictor 210 may search for a similar path of the set L to complete the missing geographical locations between the geographical locations $d_{i_0}$ and $d_{i_1}$ of the path $D_i$. Assuming geographical locations $d_{j_0}$ and $d_{j_4}$ of the past path $D_j$ comply with the spatial similarity and the time similarity with respect to the geographical locations $d_{i0}$ and $d_{i1}$, the paths $D_i$ and a past path $D_j$ are considered similar and the current path $D_i$ may be added with the geographical locations $d_{j_1}, d_{j_2}, d_{j_3}$. The current path $D_i$ may therefore include the to include the geographical locations $d_{i_0}, d_{j_0}, d_{j_1}, d_{j_2}, d_{j_3}, d_{j_4}$ and $d_{i_1}$.

Reference is made once again to FIG. 1 and FIG. 2.

In order to further reduce location noise induced by possible inaccurate and/or corrupted AIS transmissions of an examined signal $d_i$, the path predictor 210 may apply some kinematic measurements. For every pair of consecutive geographical locations $d_i$ and $d_{i+1}$ of the current path D, the path predictor 210 may calculate the following:

A distance $\Delta x_i$ between the consecutive geographical locations $d_i$ and $d_{i+1}$, calculated using haversine formula.

A time interval $\Delta t_i$ between the consecutive geographical locations $d_i$ and $d_{i+1}$.

A speed $v_i$ of the vessel travelling from the geographical locations $d_i$ to the consecutive geographical location $d_{i+1}$, may be calculated according to $$\hat{v}_i = \frac{\Delta x_i}{\Delta t_i}.$$

A course $\hat{\alpha}_i$ calculated based on dihedral angle equation.

The path predictor 210 may replace the reported vessel values $v_i$ and $\alpha_i$ in $d_i$, the AIS information transmitted from the vessel with the calculated values $\hat{v}_i$ and $\hat{\alpha}_i$. The path predictor 210 may apply the replacement in case the difference between the reported values at the geographical location $d_i$ and the calculated values $\hat{v}_i$ and $\hat{\alpha}_i$ exceeds a predefined error value. The excessive difference may typically be a result of corrupted AIS message transmissions.

Optionally, the path predictor 210 divides the full historical path $D=\{d_0, \ldots, d_{m-1}\}$, to a plurality of leg segments $\Gamma=\{L_0, \ldots, L_{N-1}\}$ to create the behavior model (graph). The path predictor 210 may derive the leg segments by assuming straight line movement of the vessel. The path predictor 210 may identify, for example, trajectory lines of the vessel path between two or more geographical locations $d_i$ according to the AIS information received at the geographical locations $d_i$. The path predictor 210 may apply a direction change threshold value, for example, 10 degrees, 15 degrees and/or the like to identify the leg segments P. The direction change threshold value may be set as a default value and/or it may be applied by one or more users interacting with the system 200 through the user interface 208. Optionally, the direction change threshold value may be automatically adjusted according to learned movement patterns of the vessel. When the course changes above predefined threshold value, the path predictor 210 may determine the vessel has made one or more path direction changes and may divide the respective path portion to two or more leg segments.

Figure 4B:
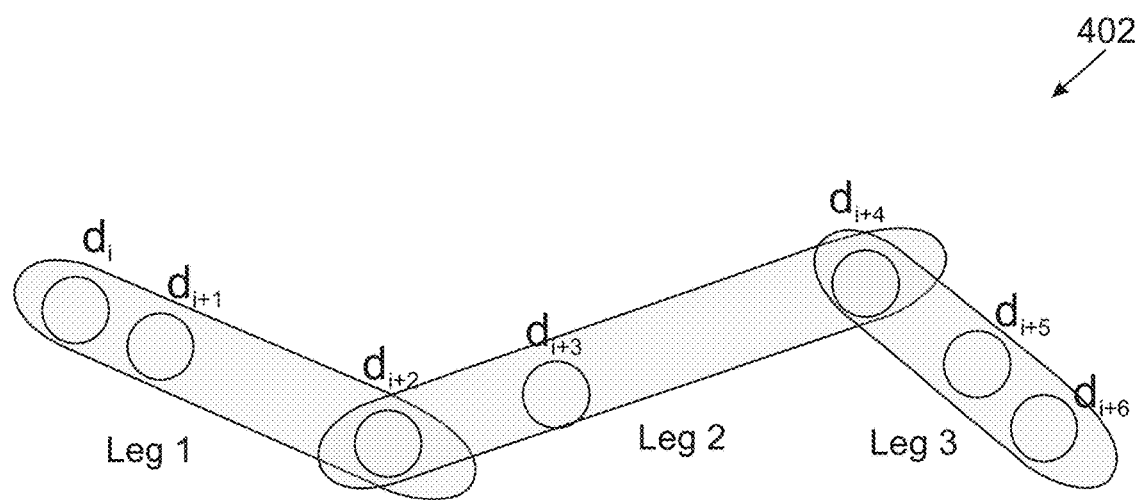
FIG. 4B is a schematic illustration of an exemplary division of a vessel's path to a plurality of leg segments, according to some embodiments of the present invention.

Reference is now made to FIG. 4B, which is a schematic illustration of an exemplary division of a vessel's path to a plurality of leg segments, according to some embodiments of the present invention. An illustration 402 presents an exemplary division of a portion of a path to a plurality of leg segments. The geographical locations $d_i, d_{i+1}, d_{i+2}, d_{i+3}, d_{i+4}, d_{i+5}$ and $d_{i+6}$ are geographical locations a path predictor such as the path predictor 210 includes in the current path $D=\{d_0, \ldots, d_{m-1}\}$ either according to the reported AIS information and/or estimated by the path predictor 210. As evident from the illustration 402 the direction change between the trajectory line drawn for the geographical locations $d_i, d_{i+1}$ and $d_{i+2}$ with respect to the trajectory line drawn for the geographical locations $d_{i+2}, d_{i+3}$ and $d_{i+4}$ may exceed the direction change threshold value, for example, 10 degrees. The path predictor 210 may therefore determine the vessel took some direction change between the geographical locations $d_{i+2}$ and $d_{i+3}$. Moreover, the direction change between the trajectory line drawn for the geographical locations $d_{i+2}$, $d_{i+3}$ and $d_{i+4}$ with respect to the trajectory line drawn for the geographical locations $d_{i+4}$, $d_{i+5}$ and $d_{i+6}$ may also exceed the direction change threshold value. The path predictor 210 may therefore divide the path D to 3 leg segments Leg 1, Leg 2 and Leg 3.

Reference is made once again to FIG. 1 and FIG. 2.

The path predictor 210 may apply one or more behavioral models, for example, a second order Markov chain (graph) to the calculated leg segments to create a movement (path) graph of the vessel. The nodes and weighted edges of the movement graph G(x) may be calculated by the path predictor 210 by clustering and merging the leg segments vertices. The edges are assigned with calculated weights that indicate a probability of transition between the nodes. The weight is calculated for each of the edges based on the historical behavior of the vessel as obtained from AIS information and/or path tracking of the vessel during one or more of the past (historical) trips. The Markov chains are stochastic processes that may be parameterized by empirically estimating transition probabilities between discrete states. The Markov chains may be used for describing systems that follow a chain of linked events, where the next state and/or output(s) depend only on the current and/or a finite number of n states of the system. The Markov chain of the first order is one for which each subsequent state depends only on the current state. Markov chains of second or higher orders are the processes in which the next state depends on two or more predecessor states.

Each node $S_i$ in the movement graph G(x) of the vessel corresponds to a physical geographical location in the world, and a weighted edge between $S_i$ and $S_j$ is a possible transition of the vessel between the geographical locations $S_i$ and $S_j$. The path predictor 210 may calculate the nodes of the movement graph G(x) as clusters of geographic legs vertexes where the clusters may be calculated using the distance across the sphere (Haversine). The path predictor 210 may apply a clustering condition in the form of, for example, a maximum distance between the nodes. The maximal distance between nodes in the same cluster may be set, for example, to 7 kilometers. The Edges of the movement graph G(x) are the leg segments with vertices in the same created nodes. The path predictor 210 may parametrize each of the edges with a conditional probability for preforming the corresponding transition between the nodes connected by the respective edge.

Figure 5A:
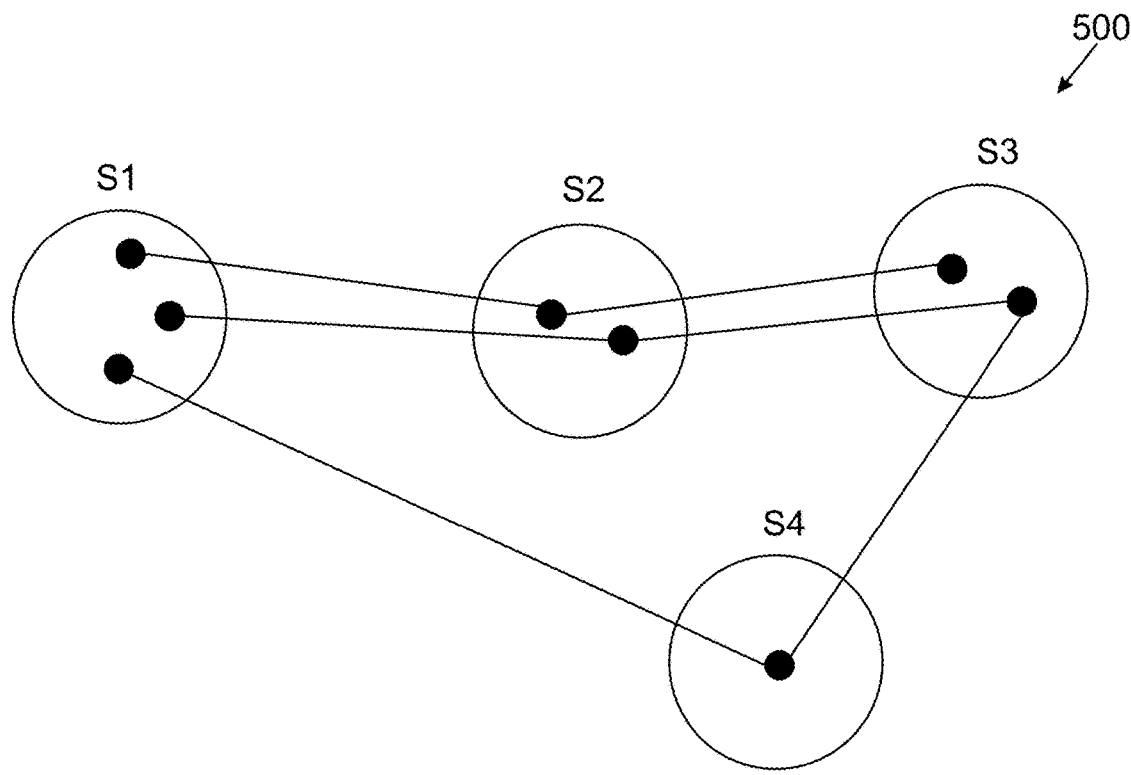
FIG. 5A is a schematic illustration of an exemplary graph node extraction created to model a vessel's path, according to some embodiments of the present invention.

Reference is now made to FIG. 5A, which is schematic illustration of an exemplary graph node extraction to model a vessel's path, according to some embodiments of the present invention. An exemplary movement graph G(x) 500 comprises geographical location nodes $S_1$, $S_2$, $S_3$ and $S_4$ that may be created by a path predictor such as the path predictor 210. The path predictor 210 may cluster the plurality of geographical locations identified for the vessel's path based on a proximity criteria of the leg segments vertexes. As can be seen from the movement graph G(x) 500, the path predictor 210 creates each of the movement graph G(x) nodes by clustering together spatially close leg segments vertices (identified in the past paths of the vessel) that are within a distance smaller than the clustering condition. The path predictor 210 creates the edges of the movement graph G(x) following the merging (clustering) process. Each edge in the graph corresponds to a movement of the vessel between two respective nodes (geographical locations) in the graph. Each edge in the graph contains the probability of the vessel to travel from one node (vertex) to another node. The path predictor 210 assigns the probability to each of the edges based on a statistical analysis of the leg segments passing between the respective nodes as identified from the past paths during the past trips of the vessel.

In order to overcome the typical unreliability of the destination static property of the AIS message(s), the path predictor 210 may apply the Second Order Markov Chain to create the movement graph G(x) in order to predict the vessel behavior. As described above, in the First Order Markov Chain, each edge represents the source and destination information of the respective two nodes (vertexes). In the Second Order Markov Chain used by the path predictor 210, each of the edges represents the predecessor node's source information and the destination node in addition to the current node (three nodes). In this model, an edge (a, b, c) corresponds to the state transition of $S_a \rightarrow S_b \rightarrow S_c$. The probability of the transition $S_a \rightarrow S_b \rightarrow S_c$ may be expressed by $P(T_n = S_b \rightarrow S_c | T_{n-1} = S_a \rightarrow S_b)$ indicating the probability of the vessel to perform a current transition $T_n$ given the previous transition $T_{n-1}$ has occurred.

Figure 5B:
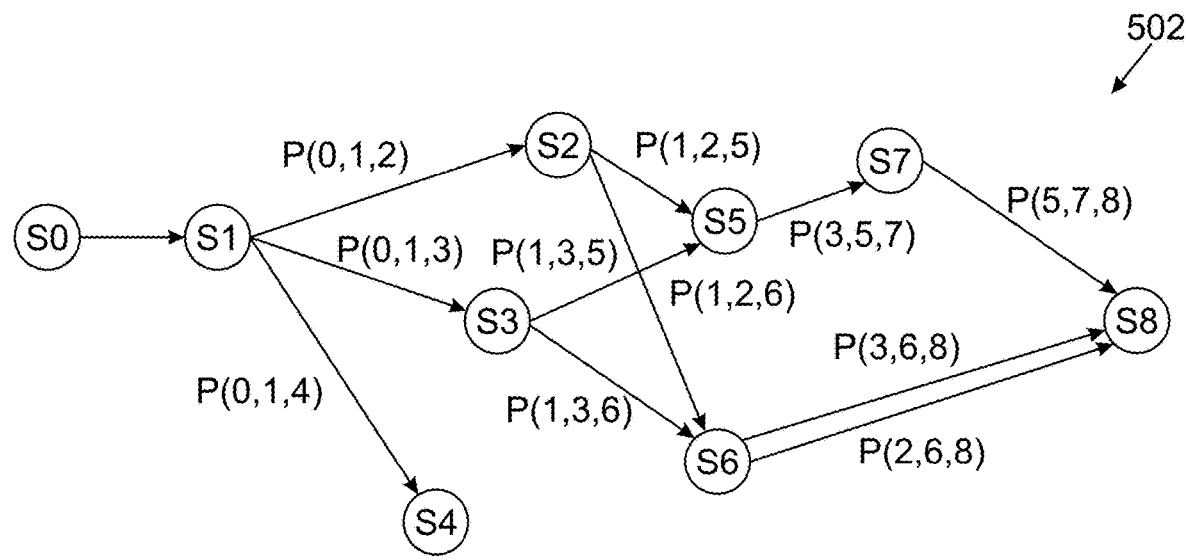
FIG. 5B is a schematic illustration of an exemplary second order Markov chain model created to estimate a vessel's path, according to some embodiments of the present invention.

Reference is now made to FIG. 5B, which is a schematic illustration of an exemplary Second Order Markov chain model created to estimate a vessel's path, according to some embodiments of the present invention. An exemplary movement graph G(x) 502 comprises geographical location nodes $S_0$, $S_1$, $S_2$, $S_3$, $S_4$, $S_5$, $S_6$, $S_7$ and $S_8$ created by a path predictor such as the path predictor 210 applying clustering to a plurality of derived leg segments vertices. As shown in the movement graph 502, the path predictor 210 calculates the probability for each edge according to the preceding node of the path, a current node of the path and a destination node of the path. For example, the edge from the node $S_1$ to the node $S_2$ also considers the preceding node $S_0$ and therefore the probability assigned to this edge may depend on the probability of the transition of the vessel between the three nodes, i.e. P(0,1,2). Similarly, the path predictor 210 assigns a probability to each possible edge in the movement graph 502. For example, there are two possible paths from the node $S_6$ to the node $S_8$, a first path originating from the node $S_3$ and a second path originating from the node $S_2$. The path predictor 210 may therefore create two edges between the node $S_6$ and $S_8$, a first edge corresponding to the path originating from the node $S_3$ and a second edge corresponding to the path originating from the node $S_2$. Each of the edges is assigned with its probability value P(2, 6, 8) and P(3, 6, 8) respectively.

Since some of the edges may represent long distances between respective pairs of nodes (geographical locations) in the movement graph G(x), for example, 600 kilometers, in order to more accurately predict the vessel's path, the path predictor 210 may divide the velocity (speed) of the vessel to velocity segments for one or more of the edges. The path predictor 210 may divide one or more of the edges in case the velocity of the vessel exceeds a velocity change threshold value, for example, a 20% change (increase or decrease) compared to a previous velocity segment. The velocity change threshold value may be set as a default value and/or it may be applied by one or more users interacting with the system 200 through the user interface 208. Optionally, the velocity change threshold value may be automatically adjusted according to learned movement patterns of the vessel. The path predictor 210 may identify the vessel's velocity based on statistical analysis of a velocity statistic distribution for the respective edge (leg segment). The path predictor 210 may apply one or more measurement to the velocity statistic distribution, for example, a minimum velocity, a maximum velocity, a mean velocity and standard deviation of the velocity.

After creating the movement graph G(x), the path predictor 210 may set the current location of the vessel in the movement graph G(x). Assuming the current path of the vessel is defined by the path D={$d_0, \ldots, d_k$}, in order to define the current location in the movement graph G(x), the path predictor 210 may need to identify an edge in the movement graph G(x) that matches the geographical location $d_m \in D$ of the vessel. As discussed above, the AIS transmissions may not be complete due to the missing AIS transmission and/or due to noisy and/or corrupted AIS transmission collected by the AIS collection system(s). Therefore trivial solutions such as, for example, setting the current location as the node $S_i$ that is closest (shortest distance) to the geographical location $d_k$ may not be suitable to accurately define the current location of the vessel. For example, the node $S_i$ in the movement graph G(x) that is closest to the geographical location $d_k$ may not be part of the vessel's path (route) and the vessel's path should be therefore taken into account when setting the current location in the movement graph.

In order to overcome the possible and probable mismatches between the actual path of the vessel and the movement graph G(x), the path predictor 210 may first interpolate the current path D={$d_0, \ldots, d_k$} to create an interpolated path D'. The missing AIS information may be estimated as described above according to the AIS information collected during the past trips of the vessel. The path predictor 210 may then select a subset $D'' \subset D'$ of representative geographical locations from the interpolated path D' that are spatially close to the nodes in the movement graph G(x). For each pair in the set D'' the path predictor 210 may search for one or more sequences of nodes in the movement graph G(x) that may represent one or more possible edges of the vessel in the movement graph G(x). The path predictor 210 ranks each of the possible edges based on the distance from the signals (in fact the geographical location associated with the AIS transmitted signals) in the set D'' to the respective nodes of each of the possible paths in the in movement graph G(x). The path predictor 210 may further rank each of the possible edges according to the distance between the geographical location $d_k$ and the respective matching edge in the movement graph G(x). The path predictor 210 may select the possible edges according to their ranks.

Figure 5C:
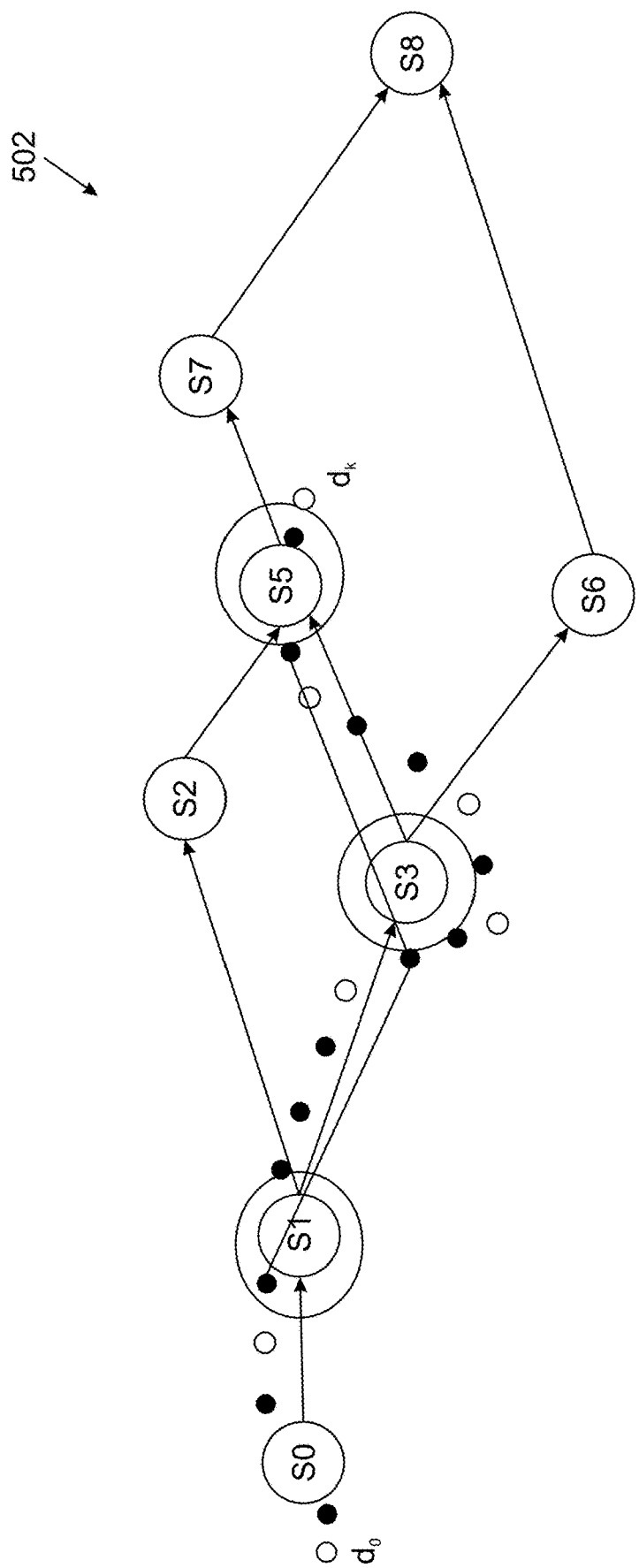
FIG. 5C is a schematic illustration of an exemplary procedure for setting a current state of a vessel on a created graph, according to some embodiments of the present invention.

Reference is now made to FIG. 5C, which is a schematic illustration of an exemplary procedure for setting a current state of a vessel on a created movement graph, according to some embodiments of the present invention. An exemplary movement graph G(x) such as the movement graph G(x) 502 is employed by a path predictor such as the path predictor 210 to set the current location of the vessel. The path predictor 210 may place a current path such as the current path D={$d_0, \ldots, d_k$} that is represented by the white dots (in FIG. 5C) against the movement graph G(x) 502. As discussed before, the path predictor 210 may interpolate the current path D to create the interpolated path D'. The interpolated path D' is represented by the union of black and white dots (in FIG. 5C). The set D'' of representative geographical locations selected by the path predictor 210 from the interpolated path D' are represented by the dots (in FIG. 5C) that are within the circles surrounding the nodes $S_1$, $S_3$ and $S_5$. The path predictor 210 then searches for a best match of the representative geographical locations of the set D'' to the sequences of nodes constituting the possible edges(s). As evident from FIG. 5C, the path predictor 210 may set the current location of the vessel to be within the edge ($S_3$, $S_5$, $S_7$).

Reference is made once again to FIG. 1 and FIG. 2.

Based on the movement graph G(x) and the current location of the vessel in the movement graph G(x), the path predictor 210 may estimate a plurality of movement vectors presenting possible future paths and leading to a plurality of possible future locations of the vessel at different times. The plurality of possible future locations may take place at different future times. Each of the movement vectors may contain a set of edges within the movement graph G(x), where each of the edges is assigned with its respective calculated velocity segment and its calculated edge (transition) probability. For each of the movement vectors, the path predictor 210 may calculate a vector probability (path probability), for example, as a multiplication of the edge probabilities of all the edges constituting the respective movement vector. The path predictor 210 may be constrained with a time interval for the duration of movement vectors, for example, between 6 and 48 hours, which may be translated to the future possible location of vessel in 6 to 48 hours from the current time.

The vessel may move along each of the movement vectors at a velocity according to the velocity segment assigned to each of the edges of the movement vector. The path predictor 210 may therefore predict the plurality of possible future locations at their respective future times, i.e. the time when the vessel is predicted to arrive at the respective possible future location.

The path predictor 210 may apply one or more vessel movement models to estimate the movement of the vessel along each of the movement vectors, for example, a Min-Max Walk, a Uniform Walk, a Normal Walk and/or the like. Each of the models may produce a polygon along each movement vector that represents the possible future location of the vessel at a given time. Predicting the vessel location may not depend only on the respective movement vector but rather also depend on the velocity of the vessel. Thus, the path predictor 210 generates a set of ranked polygons each associated with one of the possible future locations of the vessel at the respective time. The rank of each of the polygons represents the confidence of the prediction. The difference between the models lies in the polygons extraction method and in the ranking method.

In the Min-Max Walk model, for each movement vector, the path predictor 210 extracts the polygon based on velocities retrieved from the velocity segments of the edges constituting the movement vector. The path predictor 210 may extract the polygons directly from the movement vectors. For each movement vector, the extracted polygon may start at the possible future location the vessel may arrive when moving at the lowest velocity extracted from the respective edges of the movement vector. The extracted polygon may end at the possible future location the vessel may arrive when moving at the highest velocity extracted from the respective edges of the movement vector. The path predictor 210 may rank each of the extracted polygons according to the edge (transition) probability of the edges constituting the respective movement vector, for example, a multiplication of the edges probabilities.

The Uniform Walk model and the Normal Walk model are multi agent models in which an agent representing the vessel movement is simulated for each of the plurality of estimated movement vectors. The path predictor 210 may assign agents to the movement vectors according to the probability calculated for each of the edges, for example, a high probability edge may be assigned with a higher number of agents compared to a low probability edge. For each movement vector, each of the assigned agents may be simulated with a different one of a plurality of velocities extracted from the velocity segments of the edges constituting the movement vector. In the Uniform Walk model, each agent is assigned with a velocity based on a uniform distribution of the velocities over each velocity segment while in the Normal Walk model, each agent is assigned with a velocity based on a Gaussian distribution of the velocities over each velocity segment. For each of the movement vectors, the path predictor 210 may normalize the simulation results (possible future locations) according to the number of agents simulating the respective movement vector.

The path predictor 210 may output the predicted possible future locations as a record representing the possible future locations with their calculated location probabilities scores $pl_j$ indicating the probability of the vessel arriving (being present) at the possible future location j. For example, the path predictor 210 may generate a two dimensional histogram based on the results of the behavioral model(s) simulation. Each cell in the histogram may represent a geographical area of a pre-defined size, for example, 1 kilometer×1 kilometer. The path predictor 210 may set the calculated rank for each of the cells in the histogram according to the probabilities of the estimated movement vectors. The result is therefore a record mapping a plurality of possible future (geographical) locations of the vessel where each of the possible future locations is assigned with a location probability score.

Figure 6A:
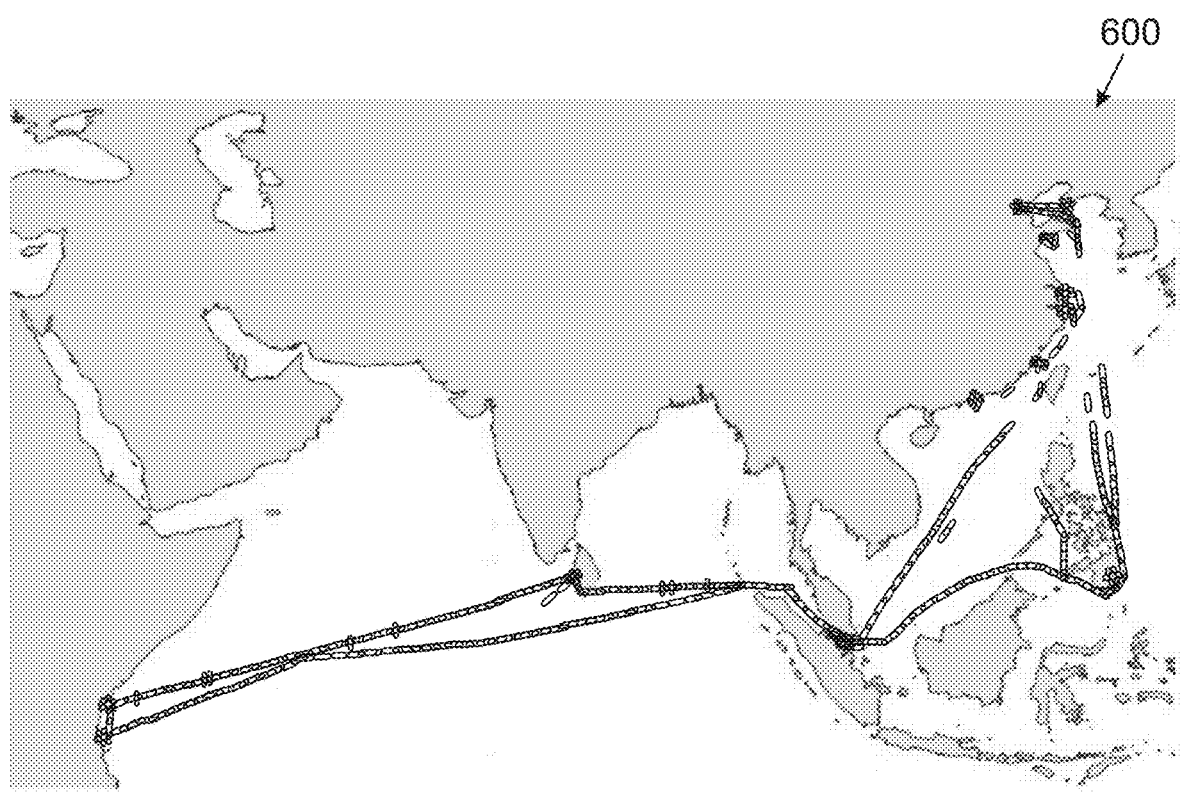
FIG. 6A is a schematic illustration of an exemplary vessel path identified according to AIS message transmissions transmitted by the vessel.

Reference is now made to FIG. 6A, which is a schematic illustration of an exemplary vessel path identified according to AIS message transmissions transmitted by the vessel. A processed imagery capture 600 presents a plurality of geographical locations along a path of a vessel over a period of 13 month. The plurality of geographical locations may be identified according to AIS messages transmitted by the vessels at the geographical locations along the path.

Figure 6B:
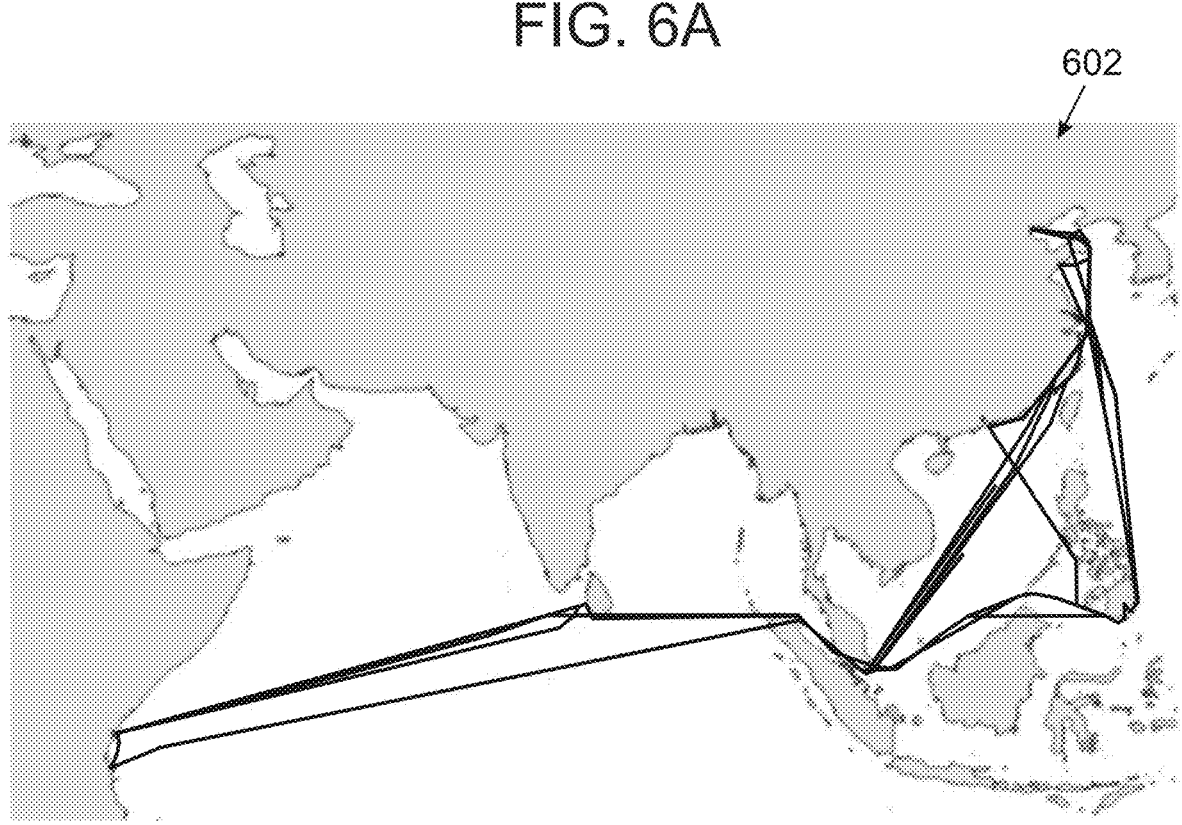
FIG. 6B is a schematic illustration of a predicted path of a vessel predicted according to movement graph created for the vessel, according to some embodiments of the present invention.

Reference is also made to FIG. 6B, which is a schematic illustration of a predicted path of a vessel predicted according to movement graph created for the vessel, according to some embodiments of the present invention. A processed imagery capture 602 presents a movement graph such as the movement graph G(x), created by a system such as the system 200 executing a process such as the process 100 for a travelling vessel such as the vessel described in the imagery capture 600 according to the AIS collected form the vessel.

Reference is made once again to FIG. 1 and FIG. 2.

As shown at 106, for each of the plurality of possible future locations of the vessel, the path predictor 210 identifies one or more candidate observation windows $ow_s$ for each of the satellites of the satellite set Sat={$sat_0$, ..., $sat_{m-1}$}. The candidate observation windows $ow_s$ may include candidate observation windows $ow_{s_i}$={$ow_j^i$} for each satellite sat E Sat at each possible future location j of the predicted possible future locations. The path predictor 210 may apply one or more satellite simulation tools such as, for example, the STK and/or the like to identify the candidate observation windows $ow_s$ according to the orbiting parameter(s) of the respective satellite $sat_i$, for example, the orbit $o_i$, an orbiting schedule, the elevation angle, the sun-ground elevation angle and/or the like. The STK is a physics-based software package for performing complex analyses for problems involving Earth-orbiting satellites. Each of the candidate observation windows $ow_s$ may indicate a time in which the vessel located at one or more of the possible future location is within view of respective one or more of the satellites of the set Sat. In other words, each candidate observation windows $ow_s$ indicates the respective possible future location is within the visual coverage area of the respective satellite at the time the vessel is located at the respective possible future location.

Using the satellite simulation tool(s), the path predictor 210 may calculate a view probability score $pv_j^i$ for each of the candidate observation windows $ow_j^i$ for each $sat_i$. The path predictor 210 may calculate the view probability score $pv_j^i$ based on one or more of a plurality of parameters, for example, a capability of an imagery sensor of the satellite $sat_i$ (e.g. night and/or day vision, camera view angle, etc.), vessel visibility, a weather condition at the possible future location at the time of the candidate observation window $ow_j^i$ and/or the like.

Optionally, when applying the Uniform Walk and the Normal Walk multi agent models, in order to calculate the location probability score $pl_j^i$ for the candidate observation windows $ow_j^i$, the path predictor 210 applies a normalized sum operation over all the agents that may be visible to the satellite sat E Sat during the candidate observation windows $ow_j^i$. Assuming an agent set A={$a_0$, ..., $a_{n-1}$} comprises n agents executed (simulated) simultaneously. Assuming a set of visible agents $AV_j^i$={$av_0$, ..., $av_{k-1}$}, $AV_j^i \subseteq A$ comprises all agents of the set A that may be visible by the satellite, $sat_i$ in the candidate observation windows $ow_j^i$. The probability $pl_j^i$ of the possible future geographical location j to be visible by the satellite sat may therefore be defined by Equation 2 below.

$$pl_j^i = \frac{|AV_j^i|}{|A|}$$

Equation 2

As shown at 108, the path predictor 210 calculates a detection probability score $pd_j^i \in [0,1]$ for each of the candidate observation windows owl based on the location probability score $pl_j^i$ and the view probability score $pv_j^i$ according to the formula expressed in Equation 3 below. The detection probability score pd) indicates the probability that the vessel will reach the possible future location j at the time of the candidate observation windows owl and be detected by the satellite $sat_i$.

$$pd_j^i = pl_j^i \times pv_j^i$$

Equation 3:

As shown at 110, the path predictor 210 selects the observation window owl that presents the highest probability score $pd_j^i$. The selected observation window may then be reserved in advance in order to allow visual tracking of the travelling vessel along its course.

As shown at 112, which is a decision point, the path predictor 210 may determine whether the vessel has been detected in the selected observation window. In case the vessel has been detected, the process branches to step 114 and completes. In case the vessel was not detected in the selected observation window, the path predictor 210 may branch to step 104 and repeat the process in order to select another candidate observation window that presents the highest probability to detect the vessel. The path predictor may adjust the current location of the vessel compared to the previously used current location since the vessel may have changed its location between the time of the previous prediction cycle and the current one.

The process of steps 104 through 112 may be repeated for one or more additional geographical location along the path of the vessel.

It is expected that during the life of a patent maturing from this application many relevant mobile application methodologies will be developed and the scope of the term mobile application is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of tracking a travelling vessel, comprising:
    obtaining a list of plurality of satellites capable of detecting a vessel estimated to travel along paths predicted for said vessel and identifying at least one of said plurality of satellites which is capable of detecting said vessel in at least one of a plurality of locations along said predicted paths, for said at least one location the following is performed:
        predicting a plurality of possible future locations of said vessel according to a plurality of estimated movement vectors derived from a movement graph generated for said vessel based on at least one of a historical movement path, a recent movement path and a current location of said vessel;
        estimating a plurality of observation windows of said plurality of satellites to identify a plurality of candidate observation windows associated with said plurality of possible future locations, in each of said plurality of candidate observation windows at least one of said plurality of satellites has a visual coverage of at least one of said plurality of possible future locations;
        calculating a detection probability score for each of said plurality of candidate observation windows according to a location probability score calculated for each of said plurality of possible future locations and a view probability score calculated for each of said plurality of candidate observation windows;
        selecting a preferred one of said plurality of candidate observation windows presenting a highest said detection probability score; and
        repeating said predicting, said estimating, said calculating and said selecting in case said vessel is not detected during said preferred candidate observation window;
    wherein said movement graph comprises a plurality of nodes connected by a plurality of weighted edges, and
    wherein each of said plurality of nodes is calculated based on a preceding node and a succeeding node of said plurality of nodes.

2. The computer implemented method of claim 1, wherein at least some of said plurality of satellites are low earth orbiting satellites having a radial velocity higher than a self-rotation velocity of earth thus each of said at least some satellites completes a respective orbit faster than a complete self-rotation of earth.

3. The computer implemented method of claim 1, wherein said recent movement path is determined according to a movement information of said vessel extracted from a plurality of periodic Automatic Identification system (AIS) transmissions received from said vessel.

4. The computer implemented method of claim 3, wherein each of said plurality of periodic AIS transmission includes at least some dynamic parameters of said vessel, said at least some dynamic parameters are members of a group consisting of: a current location, a speed over ground (SOG) and a course over ground (COG).

5. The computer implemented method of claim 3, further comprising adjusting said movement information based on past movement information of said vessel during past trips presenting at least some similarity to said recent movement path.

6. The computer implemented method of claim 1, wherein said current location is derived from said movement graph by fitting an interpolated said recent movement path to said movement graph.

7. The computer implemented method of claim 1, wherein each of said plurality of nodes represents a geographical location of said vessel and each of said plurality of weighted edges represents a transition between a pair of said plurality of nodes, wherein a weight of each of said plurality of weighted edges indicates a probability of said transition represented by said each weighted edge.

8. The computer implemented method of claim 7, wherein said movement graph is generated using a second order Markov chain model in which each of said plurality of nodes is calculated based on a preceding node and a succeeding node of said plurality of nodes according to said probability of at least one of said plurality of weighted edges connecting said each node to each of said two other nodes, said two other nodes comprise a source node and a destination node.

9. The computer implemented method of claim 7, further comprising dividing at least one of said plurality of weighted edges to a plurality of velocity segments, during each one of said plurality of velocity segments said vessel travels at a velocity that is different from said velocity of a preceding segment of said plurality of velocity segments and a succeeding segment of said plurality of velocity segments.

10. The computer implemented method of claim 1, wherein each of said plurality of estimated movement vectors comprises an estimated direction of said vessel and an estimated velocity of said vessel for calculating each of said plurality of possible future locations at each of a plurality of times to match each of said candidate observation windows.

11. The computer implemented method of claim 1, wherein at least one of said plurality of estimated movement vectors is calculated based on a Min-Max Walk model applied to a plurality of velocity segments of at least one edge representing said at least one estimated movement vector in said movement graph,
wherein said Min-Max Walk model extracts a polygon representing said at least one estimated movement vector by estimating said at least one movement vector while said vessel travels at a minimum velocity extracted from said plurality of velocity segments, estimating said at least one movement vector while said vessel travels at a maximum velocity extracted from said plurality of velocity segments and applying each of the estimations with a respective probability assigned to said at least one edge.

12. The computer implemented method of claim 1, wherein at least one of said plurality of estimated movement vectors is estimated by simulating a plurality of simulation agents according to a Uniform Walk model,
wherein each of said plurality of agents is assigned with a different one of a plurality of velocities extracted from a plurality of velocity segments of at least one edge representing at least one of said plurality of estimated movement vector in said movement graph, and
wherein said different velocity is calculated using a uniform distribution.

13. The computer implemented method of claim 1, wherein at least one of said plurality of estimated movement vectors is estimated by simulating a plurality of simulation agents according to a Normal Walk model,
wherein each of said plurality of agents is assigned with a different on of a plurality of velocities extracted from a plurality of velocity segments of at least one edge representing at least one of said plurality of estimated movement vector in said movement graph, and
wherein said different velocity is calculated using a Gaussian distribution.

14. The computer implemented method of claim 1, wherein estimating each of said plurality of observation windows is done by applying a multi-satellite simulation to identify a location of each of said plurality of satellites in order to determine whether said each satellite has a visual coverage of a respective one of said plurality of possible future locations at a time in which said vessel is located at said respective possible future location.

15. The computer implemented method of claim 14, wherein said multi-satellite simulation is based on at least one of a plurality of orbiting parameters of each of said plurality of satellites, said at least one orbiting parameter is a member of a group consisting of: an orbit, an orbit schedule, an elevation angle indicating an angle between said each satellite and surface and a sun-ground elevation angle indicating an angle between sun and surface.

16. The computer implemented method of claim 1, wherein said location probability score indicates a probability of said vessel being located at a respective one of said plurality of possible future locations at a time of a respective one of said candidate observation windows.

17. The computer implemented method of claim 1, wherein said view probability score indicates a probability of said at least one satellite having said visual coverage during a respective one of said candidate observation windows.

18. The computer implemented method of claim 1, wherein said location probability score of each of said plurality possible future locations is calculated by applying a normalized sum over a subset of said plurality of possible future location observable by said at least one satellite during said each observation window.

19. A system for tracking a travelling vessel, comprising:
at least one processor adapted to execute a code, said code comprising
code instructions to obtain a list of plurality of satellites capable of detecting a vessel estimated to travel along paths predicted for said vessel and identifying at least one of said plurality of satellites which is capable of detecting said vessel in at least one of a plurality of locations along said predicted paths, for said at least one location said code comprises:
code instructions to predict a plurality of possible future locations of said vessel according to a plurality of estimated movement vectors derived from a movement graph generated for said vessel based on at least one of a historical movement path, a recent movement path and a current location of said vessel;
code instructions to estimate a plurality of observation windows of said plurality of satellites to identify a plurality of candidate observation windows, in each of said plurality of candidate observation windows at least one of said plurality of satellites has a visual coverage of at least one of said plurality of possible future locations;
code instructions to calculate a detection probability score for each of said plurality of candidate observation windows according to a location probability score calculated for each of said plurality of possible future locations and a view probability score calculated for each of said plurality of candidate observation windows;
code instructions to select a preferred one of said plurality of candidate observation windows presenting a highest said detection probability score; and
code instructions to repeat said predict, said estimate, said calculate and said select in case said vessel is not detected during said preferred candidate observation window;
wherein said movement graph comprises a plurality of nodes connected by a plurality of weighted edges, and wherein each of said plurality of nodes is calculated based on a preceding node and a succeeding node of said plurality of nodes.

* * * * *